United States Patent [19]
Cavanaugh

[11] Patent Number: 5,664,799
[45] Date of Patent: Sep. 9, 1997

[54] VEHICULAR DISPLAY MODULE

[76] Inventor: Michael J. Cavanaugh, 976 Blue Star Hwy., South Haven, Mich. 49090

[21] Appl. No.: 396,736

[22] Filed: Mar. 1, 1995

[51] Int. Cl.⁶ ........................................................ B62B 3/02
[52] U.S. Cl. ............................. 280/656; 280/30; 280/639
[58] Field of Search ................................ 280/30, 656, 639,
280/651; 296/21, 161, 173

[56] References Cited

U.S. PATENT DOCUMENTS

| | | |
|---|---|---|
| 2,298,530 | 10/1942 | Fletcher . |
| 2,474,373 | 6/1949 | Seiden ........................ 280/87.01 |
| 2,646,309 | 7/1953 | Tuson . |
| 2,780,844 | 2/1957 | Bolt . |
| 2,793,067 | 5/1957 | Couse . |
| 3,073,646 | 1/1963 | Garrison, Sr. . |
| 3,207,527 | 9/1965 | Sundberg . |
| 4,175,768 | 11/1979 | Thackray ........................ 280/656 X |
| 4,631,877 | 12/1986 | Molodecki ........................ 280/30 X |
| 4,758,008 | 7/1988 | Moddejonge ........................ 280/656 X |
| 4,958,874 | 9/1990 | Hegedus . |
| 5,310,209 | 5/1994 | Holman . |
| 5,480,170 | 1/1996 | Kaiser, II ........................ 280/30 |

FOREIGN PATENT DOCUMENTS

| | | | |
|---|---|---|---|
| 486003 | 8/1952 | Canada ........................ 280/639 |
| 0497498 | 8/1992 | European Pat. Off. ........................ 280/656 |
| 1095743 | 6/1955 | France ........................ 280/639 |
| 2191738 | 12/1987 | United Kingdom . |

Primary Examiner—Brian L. Johnson
Assistant Examiner—Frank Vanaman
Attorney, Agent, or Firm—Dinsmore & Shohl LLP

[57] ABSTRACT

An integrated transport and display module has a plurality of wall panels that are pivotally interconnected to each other. The panels are movable from a transport mode position in which the panels complete, enclose and protect a merchandise transport space to a multitude of alternate positions in which panels present display surfaces.

18 Claims, 5 Drawing Sheets

5,664,799

VEHICULAR DISPLAY MODULE

FIELD OF THE INVENTION

The present invention relates generally to exhibition units and more particularly to an integrated transport and display unit. The invention will be specifically disclosed in connection with a vehicle for transporting merchandise to an exhibition or the like that can be converted into a display stand by opening, pivoting and attaching panels that form the sidewalls of the vehicle.

BACKGROUND OF THE INVENTION

There currently are a large number of art, craft and trade shows and exhibitions at various geographical locations throughout the country. Many of these shows and exhibitions are of short duration, typically lasting for only a day or more. Since many of these shows and exhibitions have become very popular, it has become commonplace and profitable for vendors of art, craft and trade items to travel to several of these shows and exhibitions each year for the purpose of displaying and selling their goods.

In addition to transporting their goods from show to show, these vendors must set up displays to exhibit their goods at each show location. Due to the time and cost considerations associated with building satisfactory units to present their goods, many vendors have been relegated in the past to exhibiting their goods in less than adequate displays.

It has been proposed to construct exhibition displays on mobile trailers, and to use the trailers to transport the exhibit displays from one exhibition site to another. For example, in U.S. Pat. No. 4,958,874 a mobile exhibition unit constructed on a lorry trailer is disclosed. The lorry trailer of this prior art mobile exhibition unit has sidewalls that are pivoted about a horizonal pivot at the bottom of the trailer. When pivoted, the sidewalls are moved to a horizonal position that is substantially planar with the floor of the trailer. In this position, the sidewall surfaces cooperate with the floor of the trailer to form an expanded exhibition floor.

While mobile-exhibition trailers of this nature undoubtedly have significant uses, they are not practical for small vendors who have limited budgets and who most commonly display their goods in very limited display spaces. In order to be practical for small vendors, a mobile display unit must be relatively inexpensive, relatively small and easy to assemble and disassemble at exhibit sites. Furthermore, the height of the exhibit floor in the above-described mobile exhibit trailer is unacceptable for the small spaces in which many small vendors display their goods.

SUMMARY OF THE INVENTION

Accordingly, it is a primary object of the invention to provide an integrated transport and display module that is small, inexpensive and easy to assemble and disassemble.

It is another object of the invention to provide an integrated transport and display module that can be maneuvered into and used in relatively small display spaces.

It is another object of the invention to provide an integrated transport and display module that can be flexibly assembled into multiple display configurations.

Additional objects, advantages and other novel features of the invention will be set forth in the description that follows and in part will become apparent to those skilled in the art upon examination of the following or may be learned with the practice of the invention.

To achieve the foregoing and other objects, and in accordance with one aspect of the invention, an improved transport and display unit is provided that can exhibit merchandise carried within the unit. The unit comprises sidewalls and front walls which are pivotable relative to each other and are detachable from the floor of the mobile base unit; thereby permitting the sidewalls and front walls to pull apart from the trailer and create an elongated back wall and elongated sidewalls. This, in turn, permits the mobile unit to expand both in the back and on each side to a substantially larger size than the original mobile unit. Further, additional panels which can be pivotally attached to the innermost front panel (which in the expanded display mode become the outermost side panel) can be contained within the mobile unit to enlarge the back and sidewalls to an even greater extent. Moreover, the floor of the mobile unit, because it is elevated in relationship to the ground can be used as a table to further display merchandise or to carry a cash register or the likes.

In one of the preferred embodiments of the invention, legs are fastened and contained within the side and front panels. The legs are able to be released, lowered, and refastened thereby permitting them to be in contact with the ground while maintaining contact with the panel. This, in turn, provides support for the opened display mode of the mobile unit. Further, because the legs are maintained within the panels they do not effect the vehicle while it is in its closed transportation position. In other words, because the legs are contained substantially within the sides of the panels and are fastened accordingly during the closed transportation mode, they do not affect transportation by potentially contacting the ground during the transportation of the mobile unit.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

Reference will now be made in detail to the present preferred embodiments of the invention, an example of which is illustrated in the accompanying drawings wherein like numerals indicate the same elements throughout the views.

DETAILED DESCRIPTION OF THE PREFERRED EMBODIMENT

Figure 1:
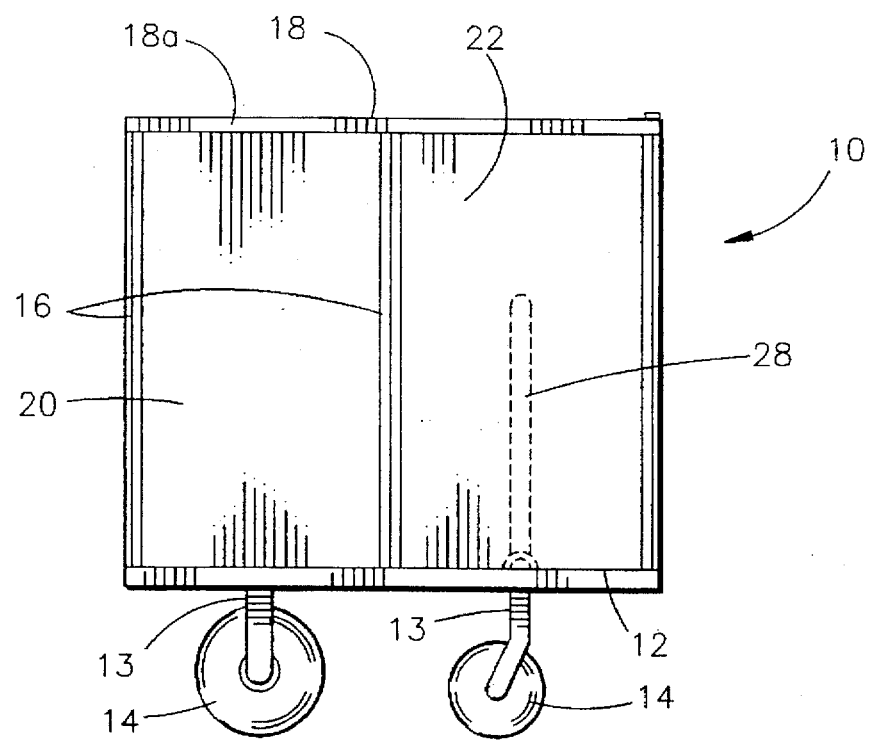
FIG. 1 is a side view of an integrated transport and display module constructed in accordance with the principles of the present in its transportation mode.
Figure 2:
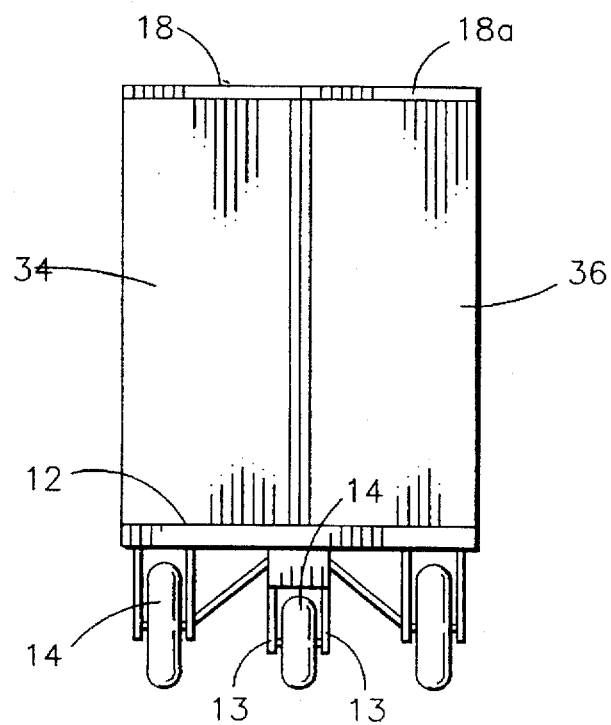
FIG. 2 is a front view of the integrated module of FIG. 1.
Figure 3:
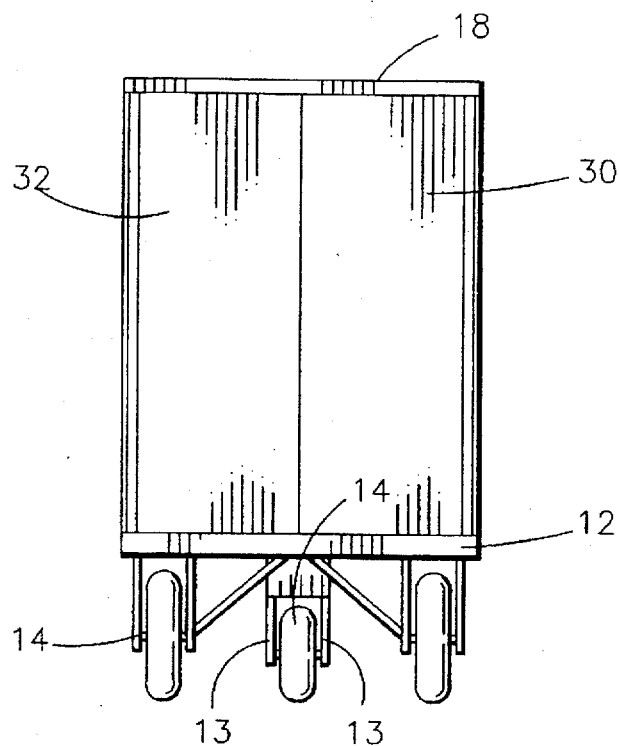
FIG. 3 is rearview of the integrated module of FIG. 1.
Figure 4:
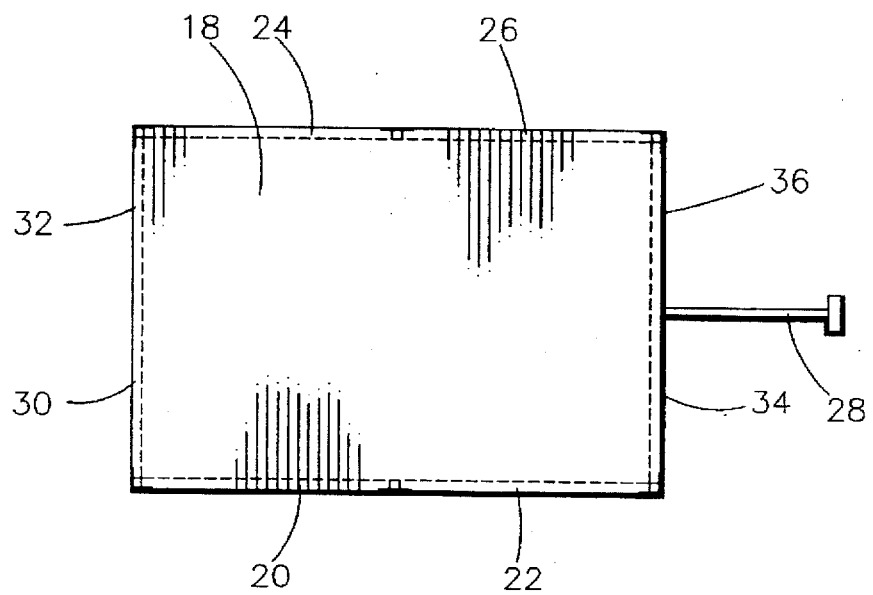
FIG. 4 is a top view of the integrated module of FIG. 1.

Referring now to the drawings, FIGS. 1–3 show an integrated transport and display module 10 constructed in accordance with the principles of the present invention. As illustrated, the module 10 includes a base 12 formed of structural members configured in a generally rectangular configuration to support a substantially planar floor member 15 (See FIGS. 5 and 8). A plurality of wheel supports 13 depend downwardly from the base 12 to rotatably support a plurality of wheels 14 that are used to roll the module 10 on the ground or on pavement. In the specific embodiment illustrated in FIGS. 1–5, the base 12 is supported by three wheels, two wheels at the rear end of the base 12 and a single steerable wheel at the front end.

As is readily surmised from collectively viewing FIGS. 1–3, a multi-panel sidewall, generally designated numeral 16, ascends upwardly from each of the four sides of the generally rectangular base 12 to completely encircle and define a storage space above the base floor 15. In the transportation mode depicted in FIGS. 1–4 the four sidewalls support a detachable roof 18 that is fitted over the sidewalls to adequately cover the storage space defined thereby. Preferably, each of the sidewall panels 16, roof 18 and floor 15 form a water resistant barrier to protect the internal storage space within the module 10 from weather and environmental elements. Thus in this transportation mode, merchandise can be placed within the enclosed storage defined by the module 10 without being exposed to or being effected by weather such as rain or wind.

The multi-panel sidewall 16 is formed by a plurality of individual panels 20, 22, 24, 26. Each of the individual panels 20, 22, 24, 26 has vertically extending sides that extend upwardly in substantially parallel relationship to each other and in substantially perpendicular relationship to the base floor 15. The panels are positioned in side-by-side relationship to each other and are pivotally interconnected by hinges interposed between their adjoining sides. Substantially planar display surfaces span the distance between the edges of each of the panels 20, 22, 24, 26 on both their internal and external sides. With a rectangular base 12 as shown in the drawings, the panels 20, 22, 24 and 26 forming the left and right sidewalls are wider than the panels 30 and 32 forming the rear sidewall and panels 34 and 36 forming the front sidewall. If a square base is used, it may be advantageous to use identically sized panels.

The base 12 has an upwardly extending flange 37 (see FIG. 8A) on its periphery to secure the panels. In the transportation mode, the panels are positioned within the flange 37. Bolts (not shown) extend through the flange 37 into the panels to hold these elements together.

As noted above, the specifically illustrated embodiment utilizes a front wheel 14 that is steerable. This steerability of the front wheel is accomplished in the preferred embodiment by rotatably mounting the front wheel support with respect to the base. A steering handle 28 can then be connected to the rotatable wheel support 13, and the module 10 can be guided by rotating the front wheel 14 with this steering handle 28. Moreover, by utilizing the steering handle 28, the module 10 can be pushed and maneuvered even in confined spaces.

Figure 5:
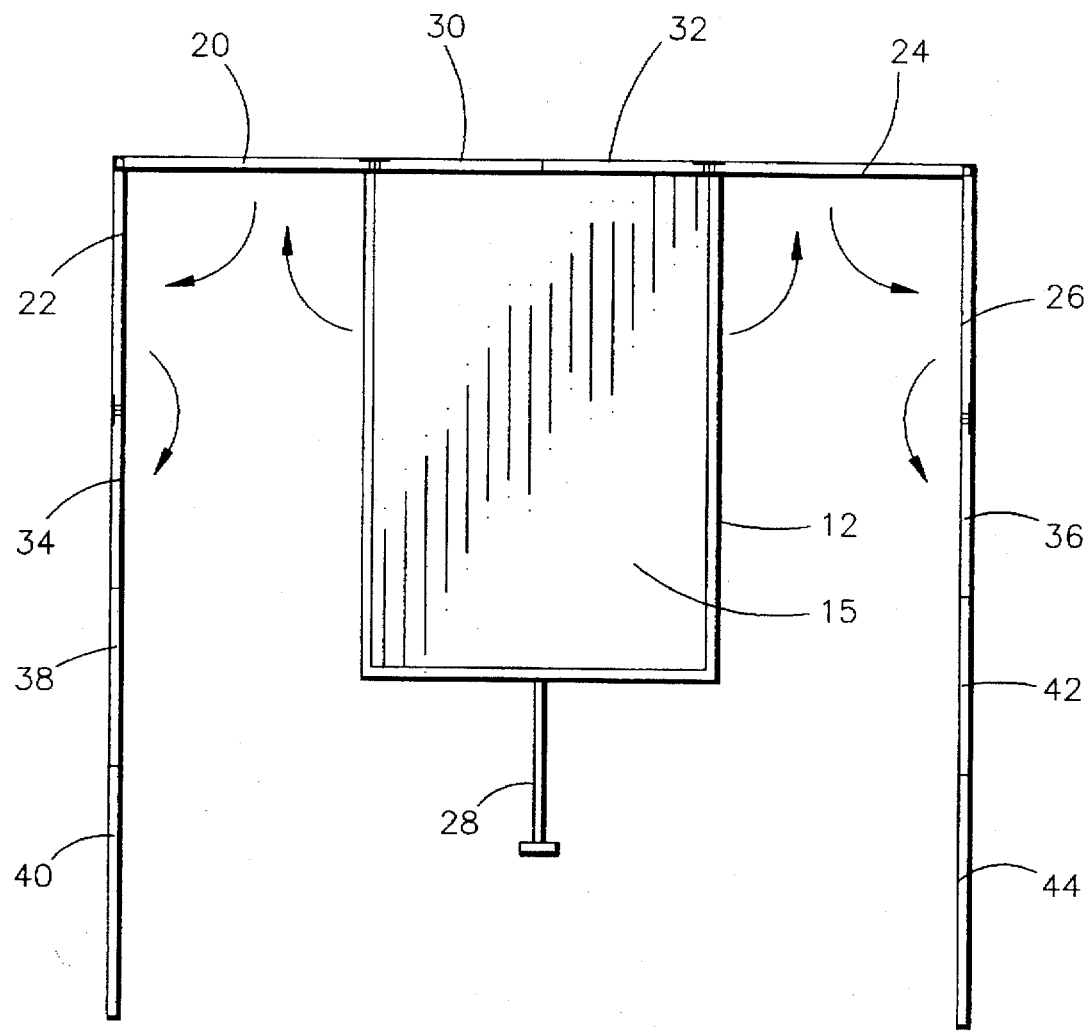
FIG. 5 is a top view of the integrated module shown in FIGS. 1–4, but illustrating the module in its display mode with supplementary side panels.
Figure 6:
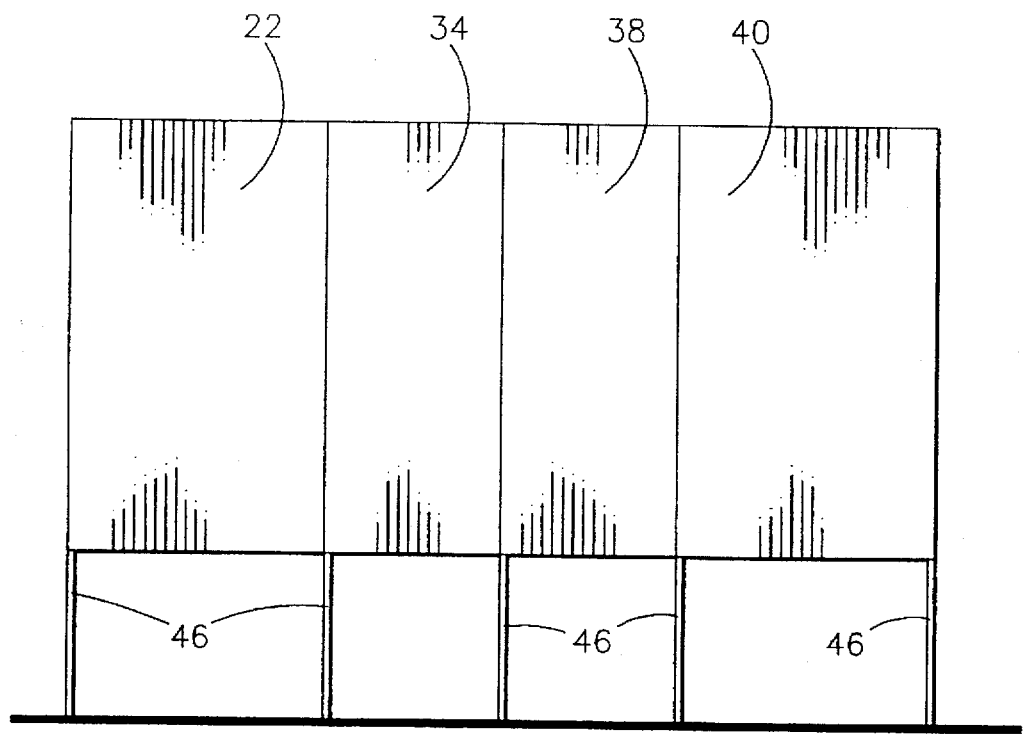
FIG. 6 is a side view of the integrated module shown in FIGS. 1–4, but illustrating the module in its display mode with supplementary side panels and legs lowered from the side panel and in contact with the ground.

Turning now to FIGS. 5 and 6, the module 10 is shown in one of its display modes. In this mode, the roof 18 has been removed and certain of the sidewalls 16 have been detached from the base 12 to reconfigure the display surfaces formed on the surfaces of the sidewalls 16. As illustrated in FIGS. 1–3, the roof 18 has downwardly extending flanges 18a about its periphery, and removal of the roof 18 is necessary to permit pivoting of the panels 16. Suitable fasteners (not shown) are used to secure the roof 18 to the panels 16 in the transportation mode to prevent accidental detachment of the roof 18 during transport. In the specific embodiment of the invention illustrated, the lower potion of the rear sidewall, formed of panels 30 and 32 is permanently attached to the rear periphery of the base 12. Each of the panels forming the left 20, 22, right 24, 26 and front sidewalls 34 and 36 are pivotally interconnected to each other about vertical axes interposed between their adjoining vertical sides. These panels 20, 22, 24, 26, 34 and 36 are removably secured with respect to the base 12. The panels 20 and 22 being secured to the left potion of the base, the panels 24 and 26 being secured to the right side of the base, and the panels 34 and 36 being secured to the front portion of the base. By so interconnecting the panels, they can be detached from the base 12 and pivoted into a variety of display configurations for exhibiting merchandise.

The configuration shown in FIG. 5 is achieved by pivoting the panels 20 and 24 of the left and right sidewalls respectively about their respective pivotal interconnections with panel 30 and 32 of the rear sidewall to bring the display surfaces of the panels 20 and 24 into substantially coplanar relationship to the display surfaces of panels 30 and 32. Panels 22 and 26 of the left and right sidewalls respectively are then pivoted with respect to the panels 20 and 24 to bring the display surfaces of panels 22 and 26 into substantially perpendicular relationship to the display surfaces of panels 20 and 24. As shown in the illustrated configuration, the panel 34 that forms a potion of the front sidewall is pivoted to bring its display surface into substantially coplanar relationship to the display surface of panel 22. Similarly, the front panel 36 is pivoted with respect to panel 26 to bring the display surfaces of these two panels into substantially coplanar relationship. One or more additional panels may optionally be attached to the respective panels 34 and 36 for enlarging the display surface. In FIG. 5, panels 38 and 40 have been attached to the side of panel 34 and panels 42 and 44 have been attached to the side of panel 36. These additional panels 38, 40, 42 and 44 may be identical to the panels used to form the sidewalls.

FIG. 6 shows the left side of the module 10 in the open display mode of FIG. 5. The configuration shown in FIG. 6 is achieved by pivoting panel 22 of the left sidewall about its pivotal interconnection with panel 20 (see FIG. 5) to bring the display surface of panel 20 into substantially perpendicular relationship to the display surface of panel 22. As shown in the configuration of FIG. 6, the front sidewall panel 34 is pivotally connected to panel 22 of the left sidewall and is pivoted to bring its display surface into a substantially coplanar relationship to the display surface of panel 22. In FIG. 6, optional panels 38 and 40 also have been attached in a substantially coplanar relationship to side panel 22. Additionally, FIG. 6 shows legs 46 which are in contact with both the side panels and the ground, thereby giving support to the module in the open display mode. These legs are maintained within the panels while the module is in transportation mode and then are released, lowered and refastened for the open display mode of the mobile unit.

Figure 7:
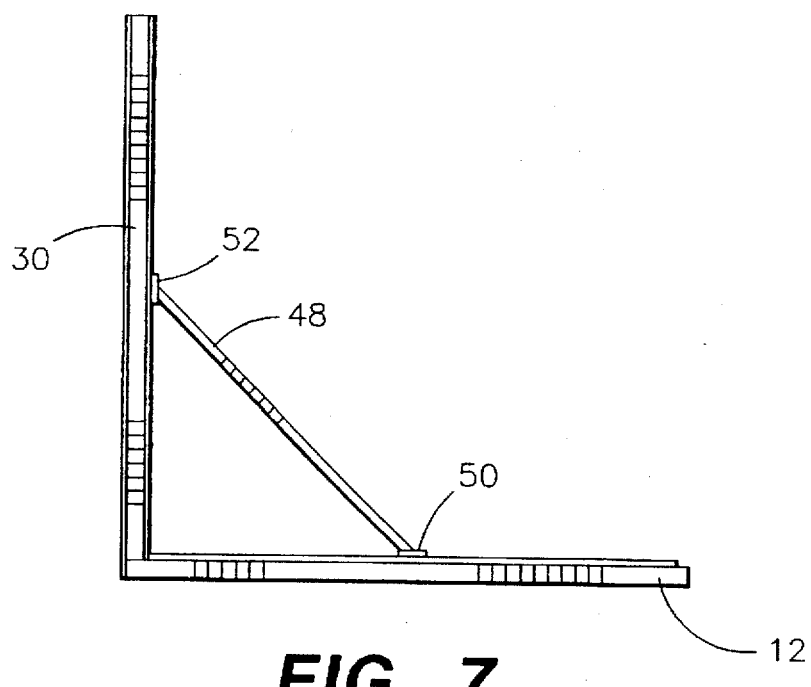
FIG. 7 is a cross-sectional elevational view (showing one corner) of the integrated module shown in FIGS. 1–4 depicting a support between the back wall and the base of the module.

FIG. 7 is a cross-sectional view of base 12 and rear sidewall panel 30 depicting a support rod 48, that is removably attached to brackets 50 and 52 located on base 12 and rear sidewall panel 30 respectively. An identical support rod (see FIG. 8) also may be extended between rearside panel 32 and base 12. The support rods 48 may be utilized during the conversion between the transportation mode and the display mode in order to remove stress from the rearside panels 30 and 32 and to provide stability during such conversion. Once the module 10 is in the complete open display mode, the support rods are no longer needed to maintain stability and, accordingly, can be removed.

It also will be appreciated that the illustrated module 10 is capable of numerous other display mode configurations. For example, the arrangement of FIG. 5 panels 16 can be reconfigured so that all of the display surfaces are coplanar by simply pivoting panels 22 and 26 with respect to panels 20 and 24. This flexibility in configuration and size of the assembled display unit allows the module 10 to be used in a wide variety of different display spaces. It also will be appreciated that the base floor 15 of the module 10 can advantageously be used as a display table. Although the steering handle 28 is shown as outwardly from the front of the base in FIG. 5 for purposes of illustration, it will be appreciated that the steering handle can be detached from the module while it is being used in the display mode.

Figure 8:
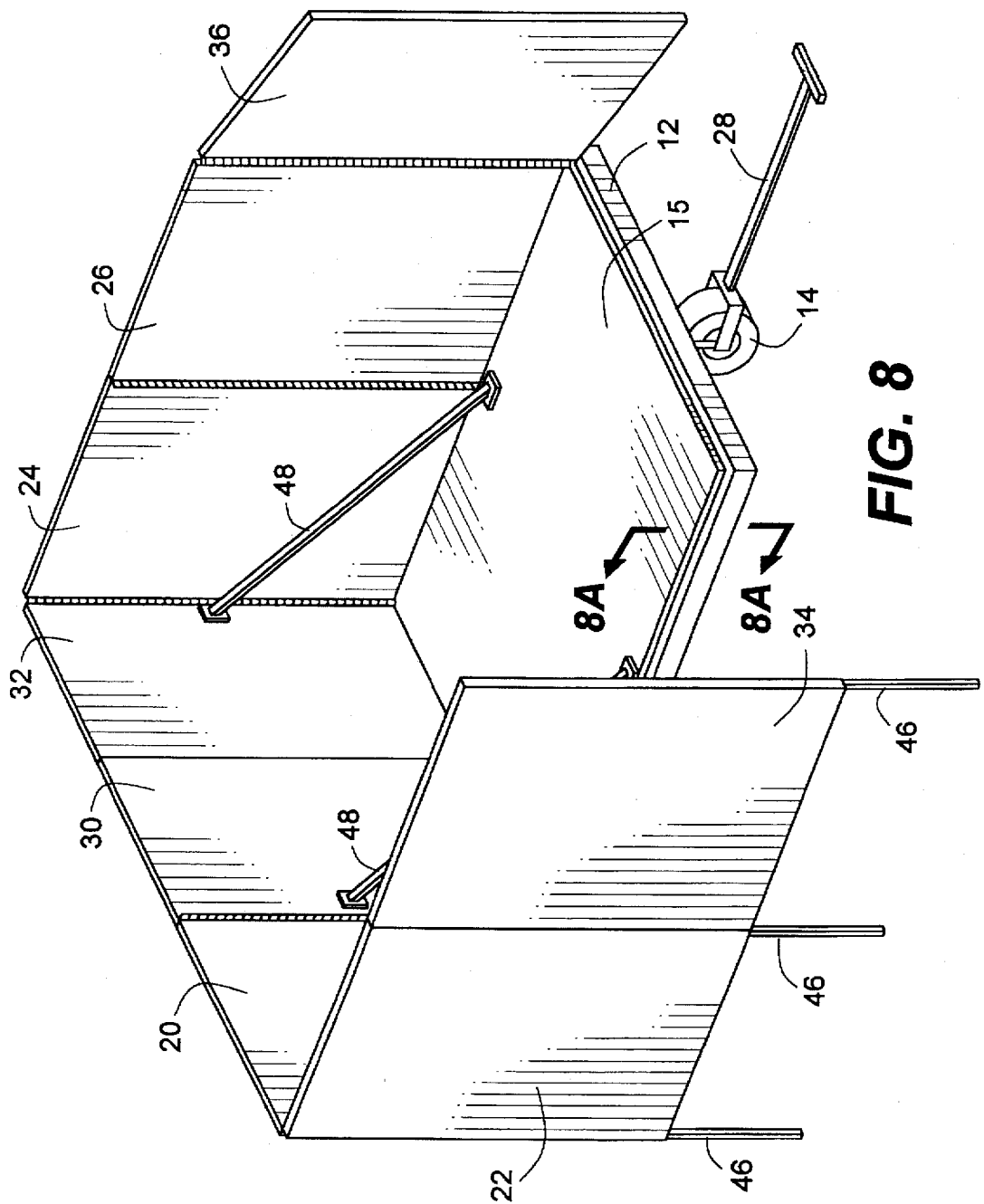
FIG. 8 is a prospective view of the integrated module of FIGS. 1–4 showing the module as it is being converted from its transport mode to its display module.
Figure 8A:
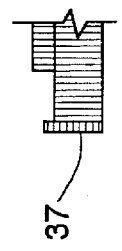
FIG. 8A is an enlarged partial cross-sectional view taken along line 8A—8A of FIG. 8.

FIG. 8 shows the module 10 as it is being converted from the transportation mode to the open display mode. Inasmuch as the bottom portions of the panels 22 and 34 (shown in FIG. 8) are elevated in the display mode, it is advisable to support panels 22 and 34 with respect to the ground. Panels 22 and 34 used in the preferred embodiment of the invention have a framework (not shown) that includes tubular steel on their vertical sides. A cylindrically shaped support leg 46 of slightly smaller diameter than the tubular frame is slidably disposed within the frame. A set screw (not shown) extending through the frame tube contacts the leg 46 to selectively prevent sliding motion of the leg 46 within the frame, and this set screw is used to lock the leg 46 in either an extended position (such as legs 46. extending from panels 22 and 34 in FIG. 8) that contacts the ground or a retracted position in which the leg is totally contained within the frame. As shown in FIG. 8, the support leg for panel 36 is in the fully retracted position and, as such, cannot be seen in the drawing.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A vehicle for transporting and displaying merchandise, comprising:
   a base;
   a rear wall permanently attached to said base and ascending perpendicular from said base;
   two side walls, each of said side walls having a first side panel and a second side panel adjacent one of said first side panels, each of said first side panels being pivotally attached to both said rear wall and its said adjacent second side panel, said side walls being detachable from said base;
   a front wall having two front panels, each of said front panels being pivotally connected to one of said side walls, said front wall being detachable from said base.

2. The vehicle of claim 1, further comprising:
   two wheels permanently attached to the bottom of said base, said two wheels being located toward the rear of said base;
   a pivoting wheel for steering said vehicle attached to the bottom of said base.

3. The vehicle of claim 2, further comprising:
   a rod having a rearward end and a forward end, said rearward end being attached to said pivoting wheel and said forward end extending to a point beyond said base; and
   a handle attached to said forward end of said rod.

4. The vehicle of claim 1, further comprising a plurality of support structures for supporting each of said walls when said walls are detached from said base, said support structures being contained substantially within said side and front panels, each of said support structures having a leg, a fastener for attaching said leg to said wall, and a release mechanism for permitting said leg to be released, lowered and refastened, thereby permitting said leg to be in contact with the ground while maintaining contact with said wall.

5. The vehicle of claim 1 further comprising at least two additional panels, each of which can be removably attached to said second side panels, said additional panels being contained within said vehicle when not attached to said second side panels.

6. An integrated transport and display module, comprising:
   a base having a single floorplate;
   a rear wall permanently attached to said base and ascending perpendicular from said base;
   at least one rotatable wheel for rolling said base along the ground, said wheel being downwardly depending from and supported by said base;
   two side walls, each of said side walls having a first side panel and a second side panel adjacent one of said first side panels, each of said first side panels being pivotally attached to both said rear wall and its said adjacent second side panel, said side walls being detachable from said base;
   each of said side walls having a first side wall position when said side walls are attached to said base, said side walls having a second side wall position when detached from said base; and
   a front wall having two front panels, each of said front panels, being pivotally connected to one of said side walls, said front wall being detachable from said base.

7. The integrated transport and display module of claim 6, wherein said side walls are positioned on the periphery of said base.

8. The integrated transport and display module of claim 6, wherein said first side wall position comprises each of said first side panels being positioned perpendicular to said rear wall and coplanar with its said adjacent second side panel.

9. The integrated transport and display module of claim 8, further comprising a detachable roof opposite said base, said roof engaging said front, rear and side walls when said side walls are in said first side wall position.

10. The integrated transport and display module of claim 6, wherein said second side wall position comprises each of said first side panels being positioned substantially coplanar with said rear wall and substantially perpendicular to its said adjacent second side panel.

11. An integrated transport and display module, comprising:

a base;

a rear wall permanently attached to said base and ascending perpendicular from said base;

at least one rotatable wheel for rolling said base along the ground, said wheel being downwardly depending from and supported by said base;

two side walls, each of said side walls having a first side panel adjacent to a second side panel, each of said first side panels being pivotally attached to both said rear wall and its said second side panel, said side walls being detachable from said base;

a front wall having two front panels, each of said front panels being pivotally connected to one of said side walls, said front wall being detachable from said base; and each of said front panels having a first front panel position when attached to said base and a second front panel position when detached from said base.

12. The integrated transport and display module of claim 11, wherein said first front panel position comprises each of said front panels being perpendicular to its said connected side wall.

13. The integrated transport and display module of claim 11, wherein said second front panel position comprises each of said front panels being coplanar with its said connected side wall.

14. The integrated transport and display module of claim 11, wherein each of said side walls has a first side wall position when said side walls are attached to said base and a second side wall position when detached from said base.

15. The integrated transport and display module of claim 14, wherein said first side wall position comprises each of said first side panels being positioned perpendicular to said rear wall and coplanar with its said adjacent second side panel.

16. The integrated transport and display module of claim 14, wherein said second side wall position comprises each of said first side panels being positioned substantially coplanar with said rear wall and substantially perpendicular to its said adjacent second side panel.

17. The integrated transport and display module of claim 14, wherein said second side wall position comprises each of said first and second side panels being positioned substantially coplanar with said rear wall.

18. The integrated transport and display module of claim 14, wherein each of said side walls ascend perpendicularly from said base when said side walls are in said first side wall position.

* * * * *

UNITED STATES PATENT AND TRADEMARK OFFICE
CERTIFICATE OF CORRECTION

PATENT NO. : 5,664,799
DATED : Sep. 9, 1997
INVENTOR(S) : Cavanagh

It is certified that error appears in the above-identified patent and that said Letters Patent is hereby corrected as shown below:

On the title page, under item [19] and item [76], please delete "Cavanaugh" and insert thereof --Cavanagh--.

Signed and Sealed this

Seventeenth Day of March, 1998

*Attest:*

BRUCE LEHMAN

*Attesting Officer*            *Commissioner of Patents and Trademarks*